US012750401B2

(12) United States Patent
Hadad et al.

(10) Patent No.: US 12,750,401 B2
(45) Date of Patent: Sep. 29, 2026

(54) PHISHING PROTECTION

(71) Applicant: Microsoft Technology Licensing, LLC, Redmond, WA (US)

(72) Inventors: Netanel Hadad, Lod (IL); Orr Srour, Ramat Hasharon (IL); Assaf Bar-Ness, Rehovot (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 126 days.

(21) Appl. No.: 18/590,146

(22) Filed: Feb. 28, 2024

(65) Prior Publication Data

US 2025/0193236 A1 Jun. 12, 2025

Related U.S. Application Data

(60) Provisional application No. 63/606,969, filed on Dec. 6, 2023.

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
USPC ........................................................ 726/23
See application file for complete search history.

(56) References Cited

U.S. PATENT DOCUMENTS

| | | | | |
|---|---|---|---|---|
| 9,946,300 | B2 | 4/2018 | Rosenberg et al. | |
| 10,904,286 | B1 * | 1/2021 | Liu | H04L 9/3236 |
| 11,108,741 | B2 | 8/2021 | Camiel | |
| 11,290,587 | B2 | 3/2022 | Ricci | |
| 2019/0149567 | A1 * | 5/2019 | Bailey | G06F 16/24578 726/23 |
| 2023/0060464 | A1 * | 3/2023 | Ceesay | G06Q 20/042 |

FOREIGN PATENT DOCUMENTS

| | | | | |
|---|---|---|---|---|
| EP | 3343870 A1 * | 7/2018 | | G06F 21/51 |
| KR | 20180003897 A * | 1/2018 | | G06F 21/604 |
| WO | WO-2023211629 A1 * | 11/2023 | | H04L 61/5007 |

* cited by examiner

*Primary Examiner* — Sakinah White-Taylor
(74) *Attorney, Agent, or Firm* — Weaver IP L.L.C.

(57) ABSTRACT

Phishing protection utilizes a security identifier displayed in association with secure content. The identifier may be displayed separately for comparison. A security identifier may be generated by a user interface, local source, or remote source. Users may visually and/or physically confirm identifiers. An identifier may be a character string or QR code. Phishing attempts may be monitored, detected, and alerted during and outside a secure session. A device may modify images from a first computing device to a display monitor. A device interface may receive a first image from the first computing device. A detector may monitor the first image for counterfeit information. An alert generator may generate a security alert for counterfeit information. A combiner may combine with the first image, in response to a secure session, a secure image associated with a secure identifier and, in response to the detector detecting counterfeit secure information, the security alert.

20 Claims, 10 Drawing Sheets

PHISHING PROTECTION

CROSS-REFERENCE TO RELATED APPLICATIONS

This application claims priority to U.S. Provisional Patent Application Ser. No. 63/606,969, filed Dec. 6, 2023, and titled "PHISHING PROTECTION," the entirety of which is incorporated by reference herein.

BACKGROUND

Browsing Internet content, such as websites, comes with risk. Without security information about websites to guide selections, users may navigate to unsafe websites or disclose sensitive information. For example, a user may browse to a website that installs harmful software, called malware, on their computing device. A website may also be designed to trick a user into installing malware on their computing device. Such malware may harm the computing device of the user, enable the theft of personal data, enable unauthorized access to a network of computers, or the like. A website may also be designed to engage in phishing for user information, scam users for payments or payment information, and/or perform other illicit monetization techniques (e.g., cybercrimes).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for phishing protection. A secure session is implemented between devices without trust in intervening devices or components. A security identifier is displayed in association with secure content. A secure identifier may also be displayed separately for comparison. The security identifier may be generated by a user, a local secure source, or a remote secure source. The user may visually and/or physically confirm a security identifier, such as a character string or a quick response (QR) code. Phishing attempts are monitored, detected, and alerted during and outside a secure session.

In aspects, a device, such as a docking station, is configured to modify images received from a first computing device for display on a display monitor. The device may comprise an interface, a detector, an alert combiner, and a combiner. The interface is configured to receive a first image (e.g., display video) from the first computing device. The detector is configured to monitor the first image for an indication of counterfeit secure information. The alert generator is configured to generate a security alert if the detector detects counterfeit secure information. In response to a secure session being conducted, the combiner is configured to combine a secure image (e.g., a secure window) associated with a secure identifier with the first image. In response to the detector detecting counterfeit secure information, the combiner is configured to present the security alert in association with the first image.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1A:
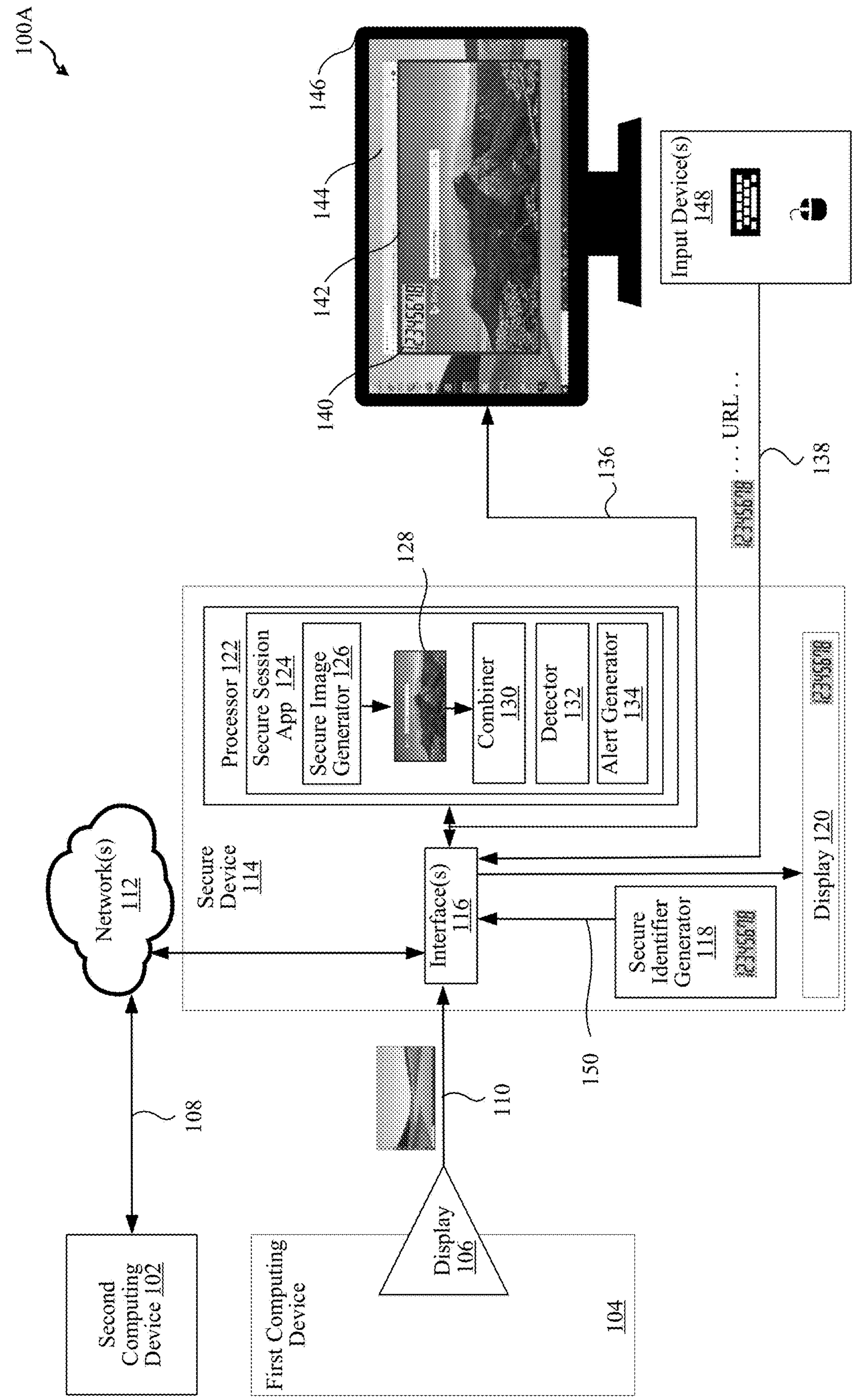
FIG. 1A shows a block diagram of a system configured to provide phishing protection, in accordance with an embodiment

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Without security information about websites to guide selections, users may navigate to unsafe websites or disclose sensitive information. For example, the computing device of a user may become infected with malware. Such malware may harm the computing device of the user, enable the theft of personal data, enable unauthorized access to a network of computers, or the like. A website may also be designed to engage in phishing for user information, scam users for payments or payment information, and/or perform other illicit monetization techniques (e.g., cybercrimes). For instance, during a phishing attack, an attacker presents a computing device with an image that appears to be secure window for display on a display of the computing. However, the image is not a secure window, and if a user interacts with the image, the interactions of the user, such as typing and other operations, are revealed to the operating system (OS) of the computing device in a non-secured manner. For example, malicious software may become associated with the OS that corrupts the OS and causes a counterfeit secured screen region to be displayed that is not actually secure. This may result in user input provided to the secured screen region being provided to the corrupted OS without encryption, allowing access to the user input by an attacker.

As such, systems, apparatuses, methods, and computer program products are disclosed herein for phishing protection. A secure session is implemented between devices without trust in intervening devices or components. A security identifier is displayed in association with secure content. The secure identifier may also be displayed separately for comparison. The security identifier may be generated by a user, a local secure source, or a remote secure source. The user may visually and/or physically confirm a security identifier. An identifier may be, for example, a character string or a quick response (QR) code. Phishing attempts are monitored, detected, and alerted during and outside a secure session.

In aspects, a device, such as a docking station, is configured to modify images received from a first computing device for display on a display monitor. The device may comprise an interface, a detector, an alert combiner, and a combiner. The interface is configured to receive a first image (e.g., display video) from the first computing device. The detector is configured to monitor the first image for an indication of counterfeit secure information. The alert generator is configured to generate a security alert if the detector detects counterfeit secure information. In response to a secure session being conducted, the combiner is configured to combine a secure image (e.g., a secure window) associated with a secure identifier with the first image. In response to the detector detecting counterfeit secure information, the combiner is configured to present the security alert in association with the first image.

Embodiments have numerous advantages. For instance, when using a secure device in secure mode, user input (e.g., typing, drawing/inking) is provided (e.g., to a cloud server) and a responsive image is produced so that the client's operating system (OS) is not exposed to user input or screen display. A visual indicator may be generated locally, remotely, or entered by a user and displayed on screen for a user to see. The visual indicator may be displayed elsewhere, such as on an LCD, on a cell phone message, etc., for visual comparison. Automated comparison of a secure source and the displayed indicator may also be performed. User inputs are protected with automated and manual confirmation and detection of phishing attempts using counterfeit secure information.

These and further embodiments may be implemented in various ways. For instance, FIG. 1A shows a block diagram of a system 100A configured to provide phishing protection, in accordance with an embodiment. As shown in FIG. 1, system 100A includes a first computing device 104, a second computing device 102, a secure device 114, a monitor 146, and input device(s) 148. First computing device 106 may include and associated display 106. Secure device 114 includes one or more interfaces 116, secure identifier generator 118, a display 120, and a processor 122. Processor 122 includes a secure session application (app) 124. Secure session app 124 includes a secure image generator 126, a combiner 130, a detector 132, and an alert generator 134. These components of system 100A are described in further detail as follows.

First computing device 104 is a computing device utilized by one or more users (e.g., individual users, family users, enterprise users, governmental users, administrators, etc.). First computing device 104 may comprise one or more applications, operating systems, virtual machines (VMs), storage devices, etc., that may be executed, hosted, and/or stored therein or via one or more other computing devices via network(s) 112. In an example, first computing device 104 may access one or more server devices via network(s) 112. First computing device 104 may each be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server. First computing device 104 is not limited to physical machines, but may include other types of machines or nodes, such as a virtual machine, that are executed in physical machines. An example computing device with example features is presented in FIG. 6.

First computing device 104 may operate in respective computing environments and may execute one or more processes in such respective computing environments. A process is any type of executable (e.g., binary, program, application) that is being executed by a computing device. A computing environment may be any environment in which one or more computing devices may operate and interact, including a client-server system, a multi-computer network, etc. First computing device 104 may execute a browser application, which may execute code (e.g., using a JavaScript engine) to display remote content 108, such as webpages, web applications (web apps), which may have user interfaces (e.g., graphical user interfaces (GUIs)) that user(s) interact with. For example, a remote content GUI displayed by a browser may request computer network login credentials to determine whether a user can access a company's network. A browser application may be configured to communicate (e.g., via network(s) 112) with one or more applications executed by server(s), e.g., second computing device 102.

First computing device 104 may generate display information, which may be displayed by a display 106 associated with first computing device 104 and/or may be output as first image 110, as shown in FIG. 1A. For example, first computing device 104 may be communicatively coupled to secure device 114, which receives first image 110 at interface(s) 116. First image 110 may include, for example, an operating system background (e.g., a desktop background) and one or more windows for applications that a user may be using.

In some examples, a user of first computing device 104 may connect first computing device 104 to secure device 114 to utilize secure device 114 for secure sessions that avoid and/or detect whether there are potential security risks (e.g., phishing attempts) associated with first computing device 104, such as a potentially corrupted operating system (OS).

Second computing device 102 may comprise one or more computing devices, servers, services, local processes, remote machines, web services, etc., which may include providing remote content 108. Second computing device 102 may comprise, for example, a server located on an organization's premises and/or coupled to an organization's local network, a remotely located server, a cloud-based server (e.g., one or more servers organized in a distributed manner), or any other device or service. Second computing device 102 may execute a plurality of programs. For example, second computing device 102 may be a cloud server hosting one or more websites accessible using one or more uniform resource locators (URLs) or other type of resource indicator. In some examples, second computing device 102 may host secure content accessible to authorized users.

Network(s) 112 may include, for example, one or more of any of a local area network (LAN), a wide area network (WAN), a personal area network (PAN), a combination of communication networks, such as the Internet, and/or a virtual network. In example implementations, computing device 104, secure device 114, and second computing device 102 may be communicatively coupled via network(s) 112. In an implementation, any one or more of computing device 104, secure device 114, and second computing device 102 may communicate via one or more application programming interfaces (APIs), and/or according to other interfaces and/or techniques. Computing device 104, secure device 114, and second computing device 102 may include one or more network interfaces that enable communications between devices.

Monitor 146 may be any type of display used in association with computing devices. Monitor 146 may be standalone or integrated with secure device 114. Monitor 146 may be configured to receive a combined image 136 from secure device 114, which monitor 146 displays for viewing by a user. A combined image 136 may include one or more of first image 110, secure image 128, secure identifier 150, and/or an alert (e.g., see FIG. 4B). The example of a displayed combined image shown in FIG. 1A includes secure identifier display 140, secure image display 142, and first image display 144. A user may observe secure identifier display 140 and compare it to the secure ID displayed by display 120.

Input devices 148 may include any type of input device for a computing device, such as a keyboard, a pointing device (e.g., computer mouse), a joystick, a video game controller, a scanner, a touch pad, a stylus pen, a voice recognition system to receive voice input, a gesture recognition system to receive gesture input, etc. A user may use input devices 148, for example, to enter a URL 138, e.g., to access remote content 108 on second computing device 102. A user may use input devices 148, for example, to enter secure identifier 138, which may be used as a secure identifier for a secure session or may be used to confirm secure identifier 150 created by secure identifier generator 118. By the user entering secure identifier 138 by input devices 148, the user is aware of the correct value of secure identifier 138, and thus is enabled to independently determine that a phishing attempt is underway when a displayed value of secure identifier 138 on monitor 146 does not match the value entered by the user.

Figure 6:
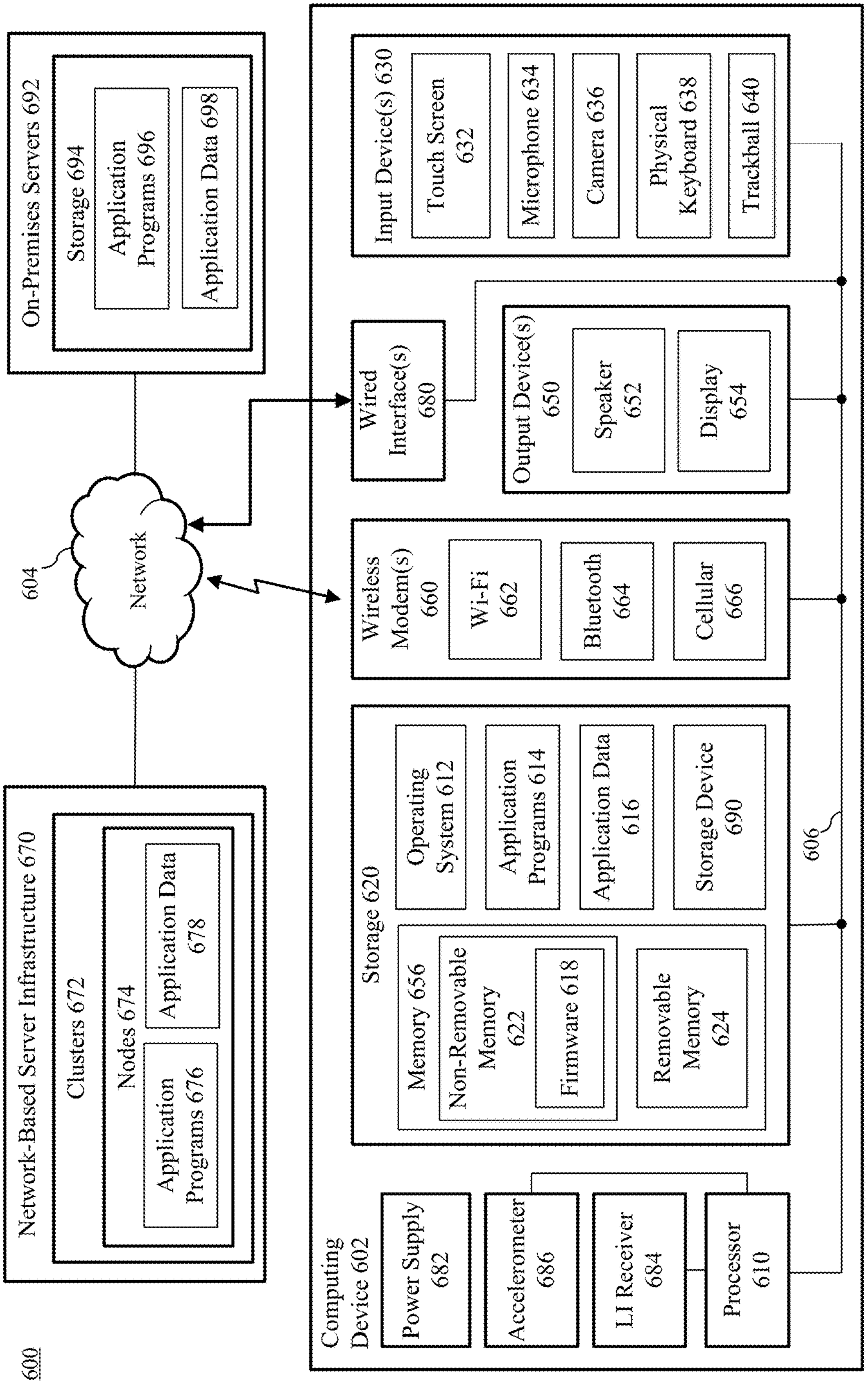
FIG. 6 shows a block diagram of an example computer system in which embodiments may be implemented.

Secure device 114 is configured to provide secure computing sessions and/or to monitor and detect security issues, such as phishing attempts, with first computing device 104. Secure device 114 may be implemented as a standalone device (e.g., a docking station) or may be integrated, for example, with first computing device 104 or with monitor 146. Secure device 114 may be utilized alone (e.g., without first computing device 104) or as an intermediate device, e.g., between first computing device 104 and one or more of network(s) 112, second computing device 102, and/or monitor 146. Secure device 114 may include, for example, a processor 122, interface(s) 116, a secure identifier generator 118, and a display 120. FIG. 6, described in further detail below, shows an example of a computing device applicable in whole or in part to a variety of different implementations of secure device 114.

Interface(s) 116 may include one or more wired or wireless, internal and/or external communication interfaces, drivers, switches, etc., such as an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, liquid crystal display (LCD) driver, an Ethernet switch, etc. Interface(s) 116 may receive inputs from and drive outputs to internal components and external devices.

For example, interface(s) 116 receive first image 110 from first computing device 104 and receive secure identifier 150 generated by secure identifier generator 118. Interface(s) 116 may receive URLs and/or secure identifiers from input devices 148. Interface(s) 116 may drive control and data signals to display 120. Interface(s) 116 may send information (e.g., URLs) to second computing device 102 via network(s) 112 and receive remote content 108 from second computing device 102. Interface(s) 116 may communicate with processor 122 executing an operating system and one or more applications, such as secure session app 124. For example, interface(s) 116 may provide first image 116, remote content 108, secure identifier 150, and user inputs 138 to processor 122 for use by secure session app 124. Interface(s) 116 may receive and forward from processor 122 browser requests (e.g., including URLs) and send them to network(s) 112. Interface(s) 116 may receive from processor 122 instructions on how to drive display 120. Interface(s) 116 may receive from processor 122 combined image 136 and drive it to monitor 146 for display.

Secure identifier generator 118 is configured to generate a secure identifier (ID) 150 for use in secure sessions. For example, secure session app 122 is configured to obtain a secure ID 150 from secure identifier generator 118 for use during a secure session. Secure identifier 150 may be any type of identifier, such as a character string (e.g., numbers, letters), a symbol (e.g., a graphical code, such as a quick response (QR) code), and/or an image. In some examples, secure identifier generator 118 may be a random number generator. As shown by example in FIG. 1A, secure identifier 150 may be a number, such as 12345678.

Display 120 may display the secure identifier 150 for a secure session, for example, so that a user need not remember the secure identifier and can quickly compare the secure identifier on the display to the secure identifier displayed on the monitor 146. Display 120 may be, for example, a liquid crystal display (LCD). For example, secure session app 124 may send a secure identifier 150 for a secure session to an LCD driver in interface(s) 116 for display by display 120. A user may visually compare the displayed secure identifier 150 with a secure identifier display 140 on monitor 146, for example, to manually identify a security issue, such as a phishing attempt.

Processor 122 comprises any type of processor, microcontroller, a microprocessor, signal processor (e.g., digital signal processor (DSP)), application specific integrated circuit (ASIC), and/or other physical hardware processor circuit) for performing computing tasks, such as program execution, signal coding, data processing, input/output processing, power control, and/or other functions. Processor 232 is configured to execute program code, such as an operating system and/or application programs. Processor 232 may perform operations, e.g., based on execution of executable code, which may include one or more steps in processes/methods disclosed herein. Processor 122 may associated with (e.g., may read and write to) a variety of memory and storage, such as SSD, RAM, ROM, flash memory, MEM, etc. Processor 122 may execute one or more applications, such as secure session application 124.

Secure session application (app) 124, e.g., when executed by processor 122, implements secure communication sessions and/or monitors for and detects security issues, such as phishing attempts. Secure device 114, via secure session app 124, may be configured to modify images received from first computing device 104 for display on monitor 146. A user may select secure session app 124 or secure session app 124 may always be active. A user may indicate a computing device to implement a secure session with, for example, by selecting or entering an address, such as URL 138, using input device(s) 148. For example, a user may type in a URL 138 indicating that secure session app 124 should create a secure session with second computing device 102. Secure session app 124 receives the URL 138 via interface(s) 116. Secure session app 124 may communicate the requested URL to second computing device 102 via interface(s) 116 and network(s) 112. Second computing device 102 may respond by providing remote content 108 to secure session app 124, again via interface(s) 116 and network(s) 112.

Secure session app 124 receives a secure identifier from secure identifier generator 118 and/or from input device(s) 148. In some examples, secure session app 124 may obtain secure identifier 118 from secure identifier generator 118 in response to receiving a request for a secure session from input device(s) 148. In some examples, secure session app 124 may provide a graphical user interface (GUI) to request that a user enter or select a secure identifier for a secure session. In some examples, secure session app 124 may provide a graphical user interface (GUI) to request that a user confirm secure identifier display 140 by entering the secure identifier displayed on monitor 146. Secure session app 124 may communicate a session number with second computing device 102, which may be displayed on monitor 46 and/or display 120.

Secure session application 124 may include, for example, secure image generator 126, combiner 130, detector 132, and alert generator 134, to perform one or more operations related to a secure session and/or monitoring and detecting security threats.

For instance, secure image generator 126 is configured to generate secure images, such as secure image 128, based on remote content 108 provided by second computing device 102. Secure image generator 126 may, for example, generate secure image 128 as the image indicated by remote content with a border (e.g., a red border) and/or with an integrated (e.g., or otherwise associated) image of the secure identifier 150.

Figure 4A:
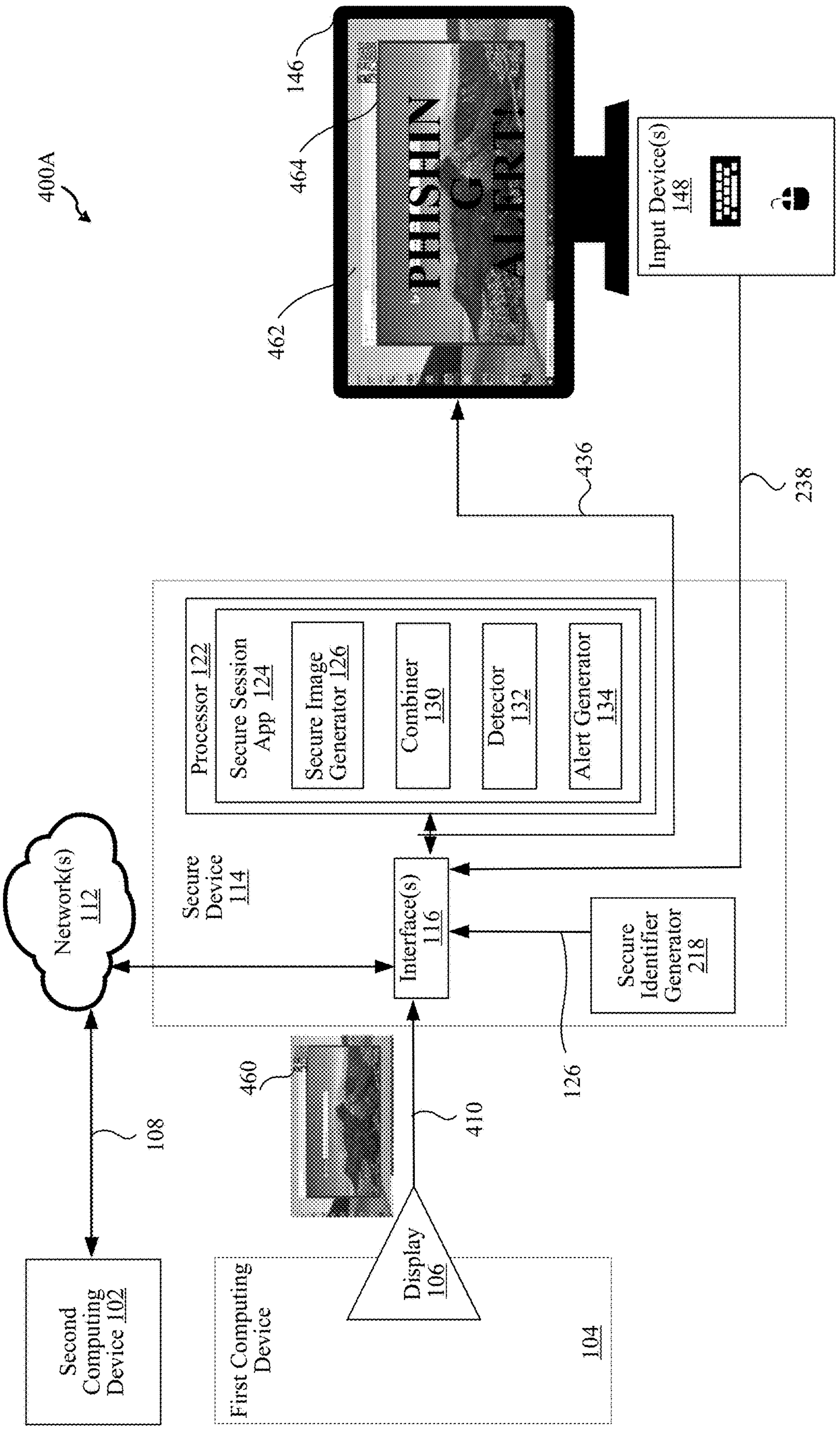
FIG. 4A shows a block diagram of yet another system configured to provide phishing protection, in accordance with an embodiment.

Combiner 130 is configured to combine the first image 110, if received, with other imagery, which may depend on a variety of scenarios. For example, in response to a secure session, combiner 130 may combine first image 110 with secure image 128 associated with a secure identifier (e.g., secure identifier 150 or 138). As shown by example in FIG. 1A, combiner 130 may overlay secure image 128 and secure identifier 150 within a border over first image 110. As shown in FIG. 4A, combiner 130 may combine first image 110 with a security alert generated by alert generator 134 in response to detector 132 detecting counterfeit secure information.

Detector 132 is configured to monitor the first image 110 for an indication of counterfeit secure information. Secure sessions are implemented through secure device 114. A "secure session" appearing in first image 110 may indicate a counterfeit secure session generated by a corrupted executable in first computing device 104. Counterfeit secure information may include, for example, a counterfeit secure border, a counterfeit secure image, a counterfeit secure identifier, a counterfeit secure session ID, etc. Detector 132 may be configured to process first image 110 in search of one or more of these indicia or characteristics present in imagery (e.g., video) in first image 110. For example, detector 132 may implement one or more pattern matching criteria to determine whether display 106 includes one or more types of counterfeit secure information. A user may, additionally or alternatively, identify counterfeit secure information by knowing that the user is not in a secure session and/or by comparing a secure identifier displayed by display 120 to secure identifier display 140 displayed by monitor 146.

Alert generator 134 is configured to generate a security alert if the detector 132 indicates that it detected counterfeit secure information. Alert generator 134 may monitor or receive an indication of detected counterfeit information from detector 132. As shown in FIG. 4A, combiner 130 may combine first image 110 with a security alert generated by alert generator 134 in response to detector 132 detecting counterfeit secure information.

Figure 1B:
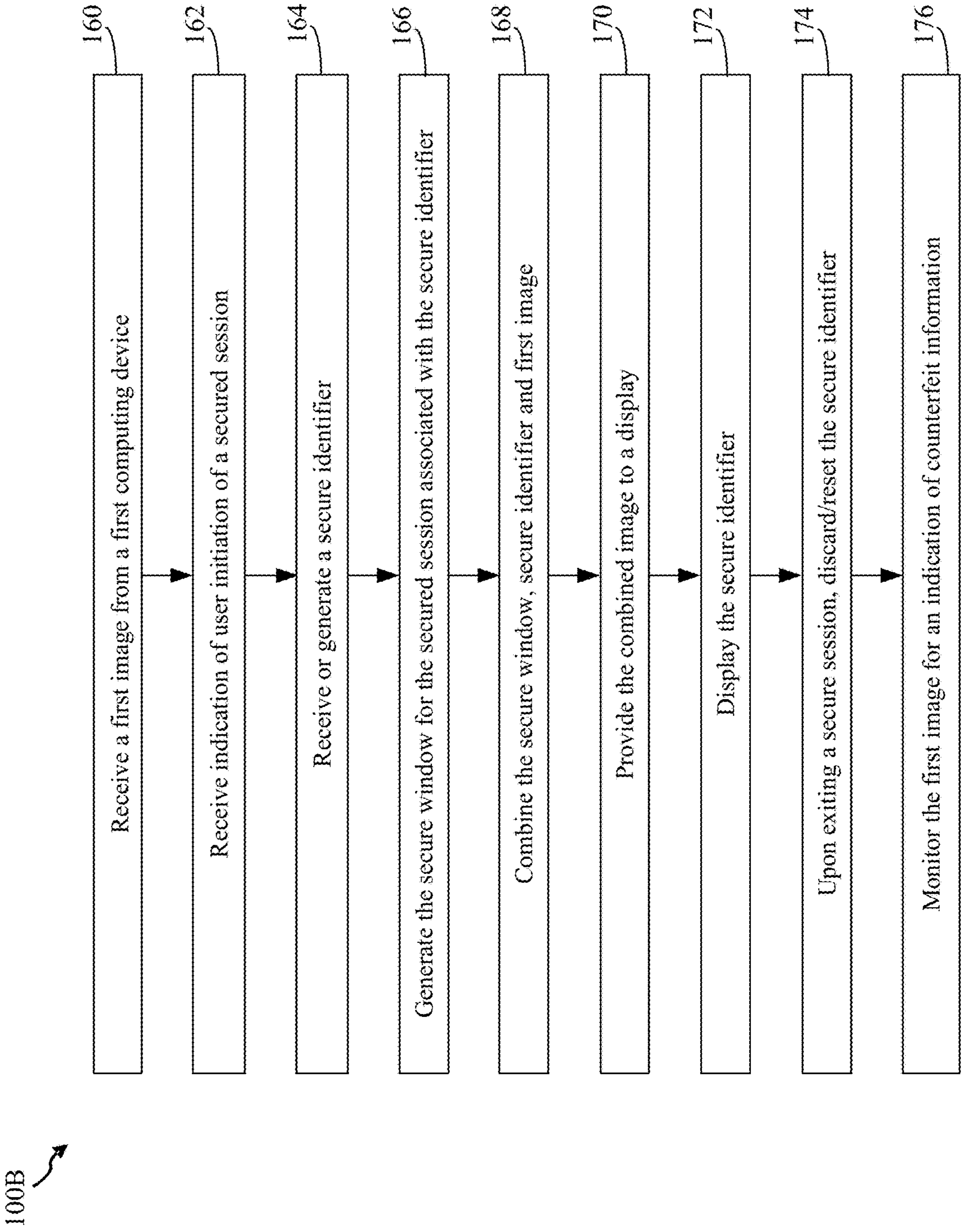
FIG. 1B shows a flowchart of a process for phishing protection, according to an embodiment.

Embodiments described herein may operate in various ways. For instance, FIG. 1B shows a flowchart 100B of a process for phishing protection, according to an embodiment. Example computing system 100A, as shown by examples in FIG. 1A, may operate according to flowchart 100B, e.g., in some embodiments. For example, example flowchart 100B may be implemented by processor 122 executing secure session app 124. Various embodiments may implement one or more steps shown in FIG. 1B with additional and/or alternative steps. Further structural and operational embodiments will be apparent to persons skilled in the relevant art(s) based on the following description of FIG. 1B.

Flowchart 100B includes step 160. In step 160, a first image is received from a first computing device. For example, as shown in FIG. 1A, secure device 114 (e.g., secure session app 124 executed by processor 122) may receive first image 110 (e.g., via interface(s) 116) from first computing device 104.

In step 162, an indication of user initiation of a secured session is received. For example, as shown in FIG. 1A, secure device may receive an indication 138 that a user is requesting a secure session (e.g., by inputting/traversing to a secure URL).

In step 164, a secure identifier (e.g., character string or QR code) is received (e.g., from user interface) or generated. For example, as shown in FIG. 1A, secure session app 124 may request and receive secure identifier 150 from secure identifier generator 118 or from user via input device(s) 148.

In step 166, a secure window is generated for the secured session associated with the secure identifier. For example, as shown in FIG. 1A, secure image generator 126 may generate secure image 128 based on remote content 108.

In step 168, the secure window, secure identifier is combined with (e.g., overlaid over) the first image. For example, as shown in FIG. 1A, combiner 130 may combine first image 110 and secure image 128, e.g., by overlaying secure image 128 over first image 110.

In step 170, the combined image is provided to a display. For example, as shown in FIG. 1A, secure session app 124 may output combined image 136 to monitor 146 via interface(s) 116.

In step 172, the secure identifier is displayed, e.g., to allow the user to manually spot a phishing attempt. For example, as shown in FIG. 1A, secure session app 124 may signal interface(s) 116 to drive display 120 to display secure identifier 150.

In step 174, upon exiting a secure session, the secure identifier is discarded/reset. For example, as shown in FIG. 1A, secure session app 124 may discard secure identifier 150.

In step 176, the first image is monitored (e.g., during and outside a secure session) for an indication of a counterfeit information (e.g., secure image or secure identifier). For example, as shown in FIG. 1A, detector 132 may monitor first image 110 for counterfeit information.

Figure 2A:
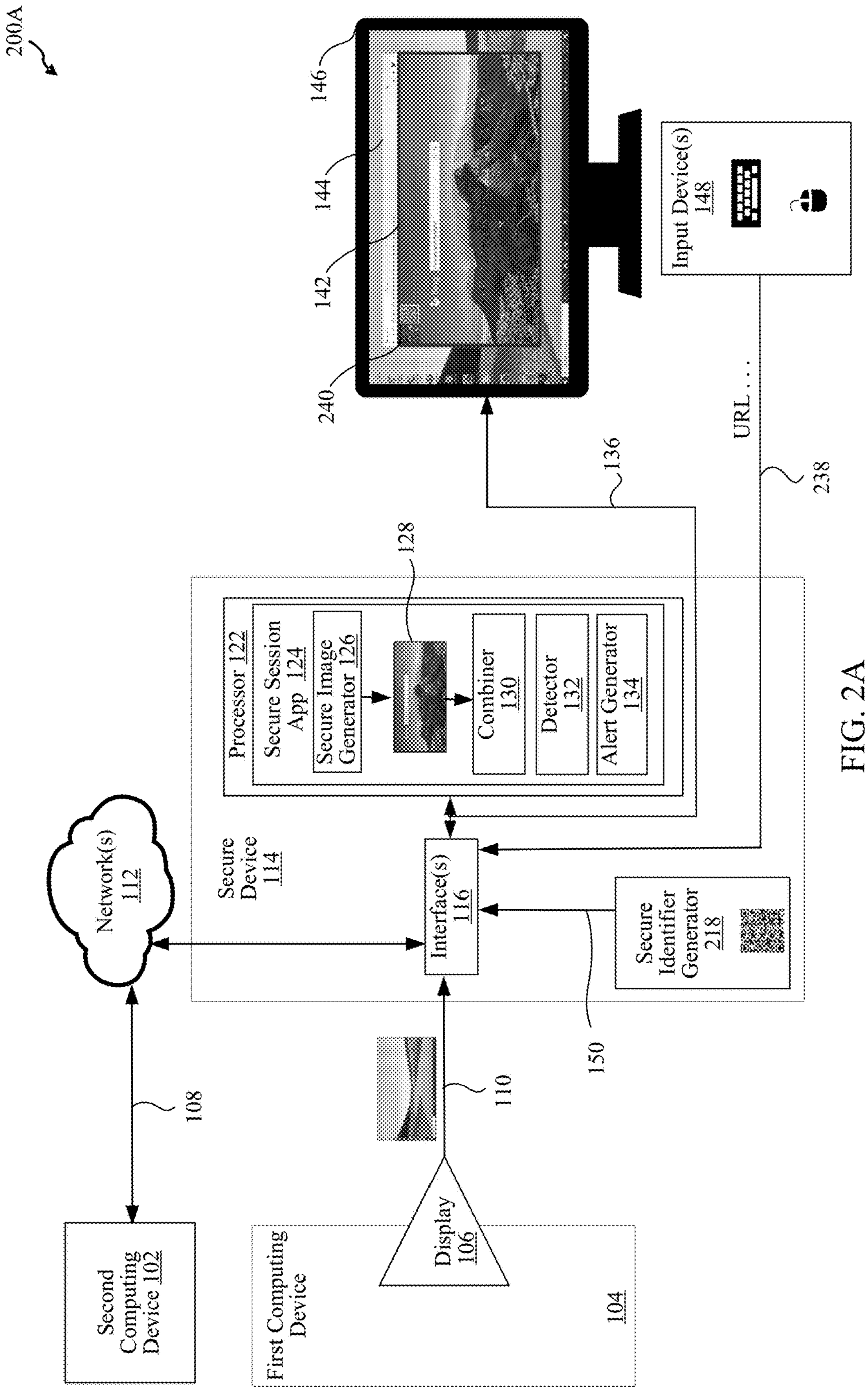
FIG. 2A shows a block diagram of another system configured to provide phishing protection, in accordance with an embodiment.

FIG. 2A shows a block diagram of a system 200A configured to provide phishing protection, in accordance with an embodiment. Compared to the example shown in FIG. 1A, the example shown in FIG. 2A implements a secure identifier generator 218 that generates a QR code as a secure identifier 126 and eliminates display 120 and user entry or confirmation of a secure identifier. In this manner, a simpler and lower cost secure device 114 may be used (without display 120), the phishing protection is provided automatically, and user input is not needed, making the operation of secure device 114 less apparent to the user. System 200A is described in further detail as follows.

As shown in FIG. 2A, secure identifier generator 218 is configured to generate a secure identifier (ID) 150 for use in secure sessions. For example, secure session app 122 may be configured to obtain a secure ID 150 from secure identifier generator 218 for use during a secure session. Secure identifier 150 may be any type of identifier, such as a character string (e.g., numbers, letters), a symbol (e.g., a graphical code, such as a quick response (QR) code), and/or an image. As shown by example in FIG. 2A, secure identifier 150 may be a QR code. A complex identifier, such as a QR code, has the advantage of being more difficult to emulate by a phishing attacker.

Input devices 148 includes any type of input device for a computing device, such as a keyboard, a pointing device (e.g., computer mouse), a joystick, a video game controller, a scanner, a touch pad, a stylus pen, a voice recognition system to receive voice input, a gesture recognition system to receive gesture input, etc. A user may use input devices 148, for example, to enter a URL 138, e.g., to access remote content 108 on second computing device 102. As a QR code may be complex, a user may not be requested to enter or to confirm a QR code, e.g., unless input device(s) 148 include a scanner to accept a QR code (e.g., from a user's cell phone).

Monitor 146 is any type of display used in association with computing devices. Monitor 146 may be standalone or integrated with secure device 114. Monitor 146 may be configured to receive a combined image 136 from secure device 114, which monitor 146 displays for viewing by a user. A combined image 136 may include one or more of first image 110, secure image 128, secure identifier 150, and/or an alert (e.g., see FIG. 4B). The example of a displayed combined image shown in FIG. 2A includes secure identifier display 240, secure image display 142, and first image display 144. Secure identifier display 240 may include, for example, an image of the QR code secure identifier 150, with or without a graphical image, as shown in FIG. 2A.

Figure 2B:
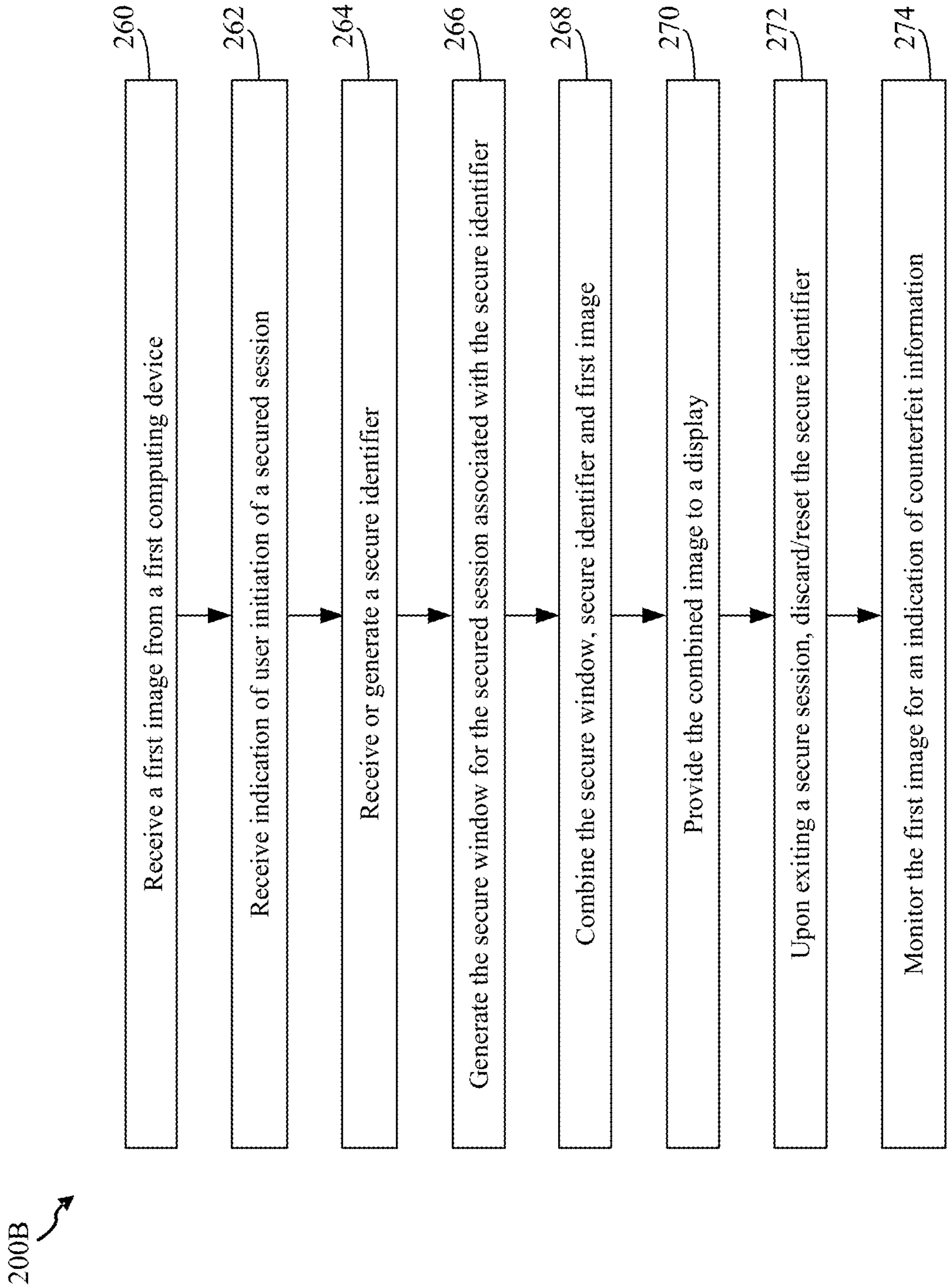
FIG. 2B shows a flowchart of another process for phishing protection, according to an embodiment.

System 200A may operate in various ways to perform its function. For instance, FIG. 2B shows a flowchart 200B of a process for phishing protection, according to an embodiment. Example computing system 200A, as shown by examples in FIG. 2A, may operate according to flowchart 200B, e.g., in some embodiments. For example, example flowchart 200B may be implemented by processor 122 executing secure session app 124. Various embodiments may implement one or more steps shown in FIG. 2B with additional and/or alternative steps. Further structural and operational embodiments will be apparent to persons skilled in the relevant art(s) based on the following description of FIG. 2B.

Flowchart 200B includes step 260. In step 260, a first image is received from a first computing device. For example, as shown in FIG. 2A, secure device 114 (e.g., secure session app 124 executed by processor 122) may receive first image 110 (e.g., via interface(s) 116) from first computing device 104.

In step 262, an indication of user initiation of a secured session is received. For example, as shown in FIG. 2A, secure device may receive an indication 138 that a user is requesting a secure session (e.g., by inputting/traversing to a secure URL).

In step 264, a secure identifier (e.g., QR code) is received (e.g., from user interface) or generated. For example, as shown in FIG. 2A, secure session app 124 may request and receive secure identifier 150 from secure identifier generator 118 or from user via input device(s) 148.

In step 266, a secure window is generated for the secured session associated with the secure identifier. For example, as shown in FIG. 2A, secure image generator 126 may generate secure image 128 based on remote content 108.

In step 268, the secure window, secure identifier is combined with (e.g., overlaid over) the first image. For example, as shown in FIG. 2A, combiner 130 may combine first image 110 and secure image 128, e.g., by overlaying secure image 128 over first image 110.

In step 270, the combined image is provided to a display. For example, as shown in FIG. 2A, secure session app 124 may output combined image 136 to monitor 146 via interface(s) 116.

In step 272, upon exiting a secure session, the secure identifier is discarded/reset. For example, as shown in FIG. 2A, secure session app 124 may discard secure identifier 150.

In step 274, the first image is monitored (e.g., during and outside a secure session) for an indication of a counterfeit information (e.g., secure image or secure identifier). For example, as shown in FIG. 2A, detector 132 may monitor first image 110 for counterfeit information.

Figure 3A:
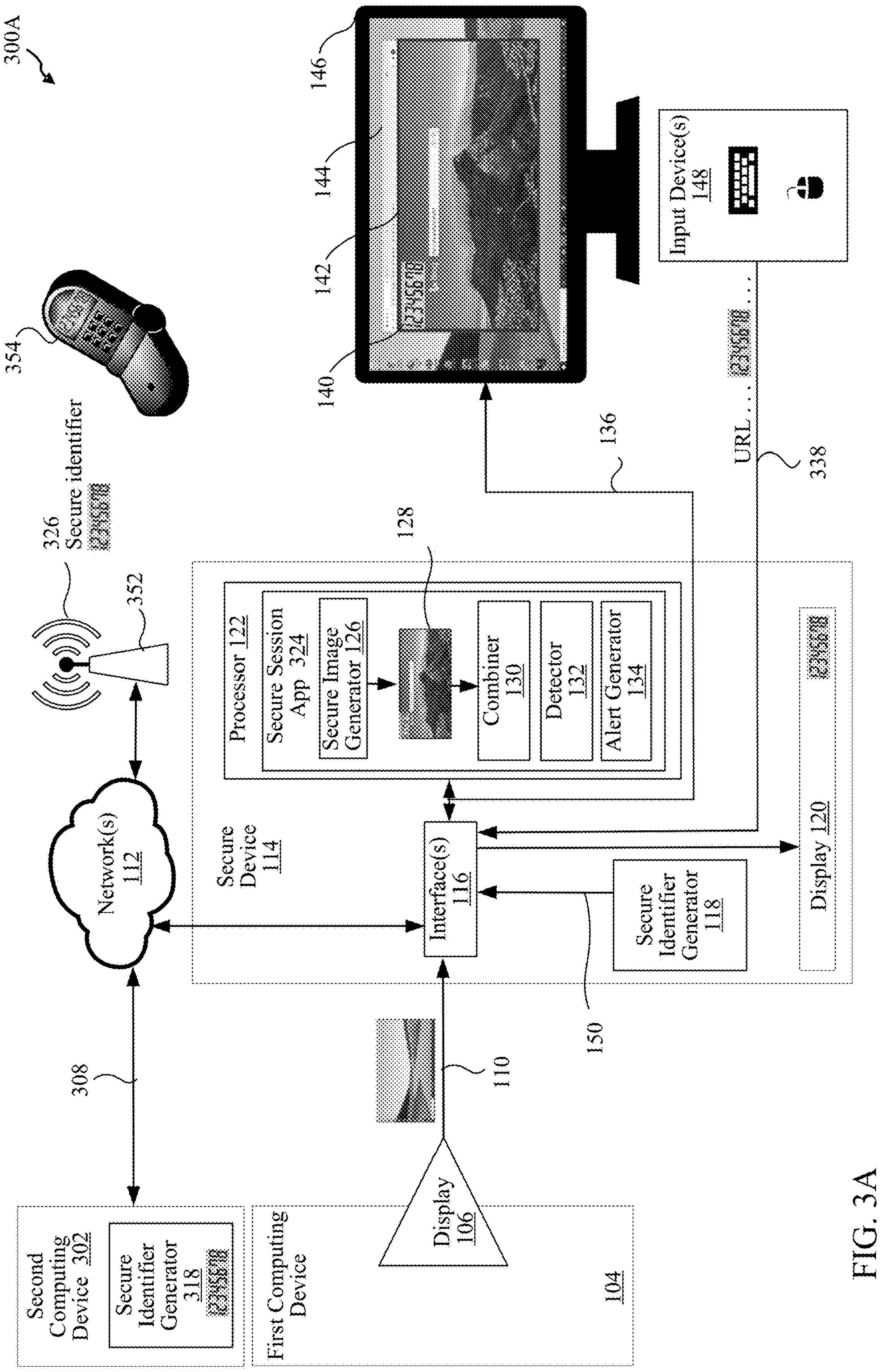
FIG. 3A shows a block diagram of still another system configured to provide phishing protection, in accordance with an embodiment.

A further system for phishing detection is described as follows with respect to FIG. 3A. In particular, FIG. 3A shows a block diagram of a system 300A configured to provide phishing protection, in accordance with an embodiment. Compared to the example shown in FIG. 1A, the example shown in FIG. 3A implements a secure identifier generator 318 in second computing device 302, which may be separately transmitted to a user, such as by text message, which the user may provide to secure device 114 via input device(s) 148.

Second computing device 102 may comprise one or more computing devices, servers, services, local processes, remote machines, web services, etc., which may include providing remote content 108. Second computing device 102 may comprise, for example, a server located on an organization's premises and/or coupled to an organization's local network, a remotely located server, a cloud-based server (e.g., one or more servers organized in a distributed manner), or any other device or service. Second computing device 102 may be implemented as a plurality of programs executed by one or more computing devices. For example, second computing device 102 may be a cloud server hosting one or more websites accessible using one or more URLs. In some examples, second computing device 102 may host secure content accessible to authorized users.

As shown in FIG. 3A, second computing device 302 includes secure identifier generator 318. In some examples, secure session generator 126 may select which of several sources may generate a secure ID (e.g., second computing device 302, secure device 114, or user). Second computing device 302 may obtain a secure ID from secure identifier generator. Second computing device may provide remote content with the secure ID 308 to secure device 114.

Second computing device 302 may, e.g., additionally, send the secure ID to a device a user has access to, such as a user's cell phone. For example, as shown in FIG. 3A, network(s) 112 may include cell tower 352, which may text secure ID 308 to user's cell phone 354.

Secure identifier generator 318 is configured to generate a secure ID for use in secure sessions. For example, second computing device 302 may receive an indication to provide a secure ID associated with remove content, e.g., to provide remote content and secure ID 308. Secure ID 308 may be any type of identifier, such as a character string (e.g., numbers, letters), a symbol (e.g., a graphical code, such as a QR code), and/or an image. In some examples, secure identifier generator 318 may be a random number generator. As shown by example in FIG. 3A, secure ID 308 may be a number, such as 12345678.

A user may receive the texted secure ID on his/her cell phone 354. The user may confirm that the texted secure ID matches the secure identifier display 140 displayed by monitor 146. The user may, e.g., alternatively or additionally, provide the texted secure ID 308 to secure device 114 by typing it in or scanning it in (e.g., QR code) using input device(s) 148. The user-entered secure ID 338 may be provided to secure session app 324.

Secure session app 324 may send the secure ID to interface(s) 116 to drive the secure ID to display 120. Detector 132 may process the secure image or a separately received secure ID 308 to determine whether the secure ID 308 matches the secure ID entered by the user. Upon determining a match, secure session app 324 may create and send a secure session ID to second computing device 302. In some examples, session creation may be based on secure ID confirmation. Secure session app 324 may send the session ID to secure image generator 126 and/or display 120 for display to the user.

Figure 3B:
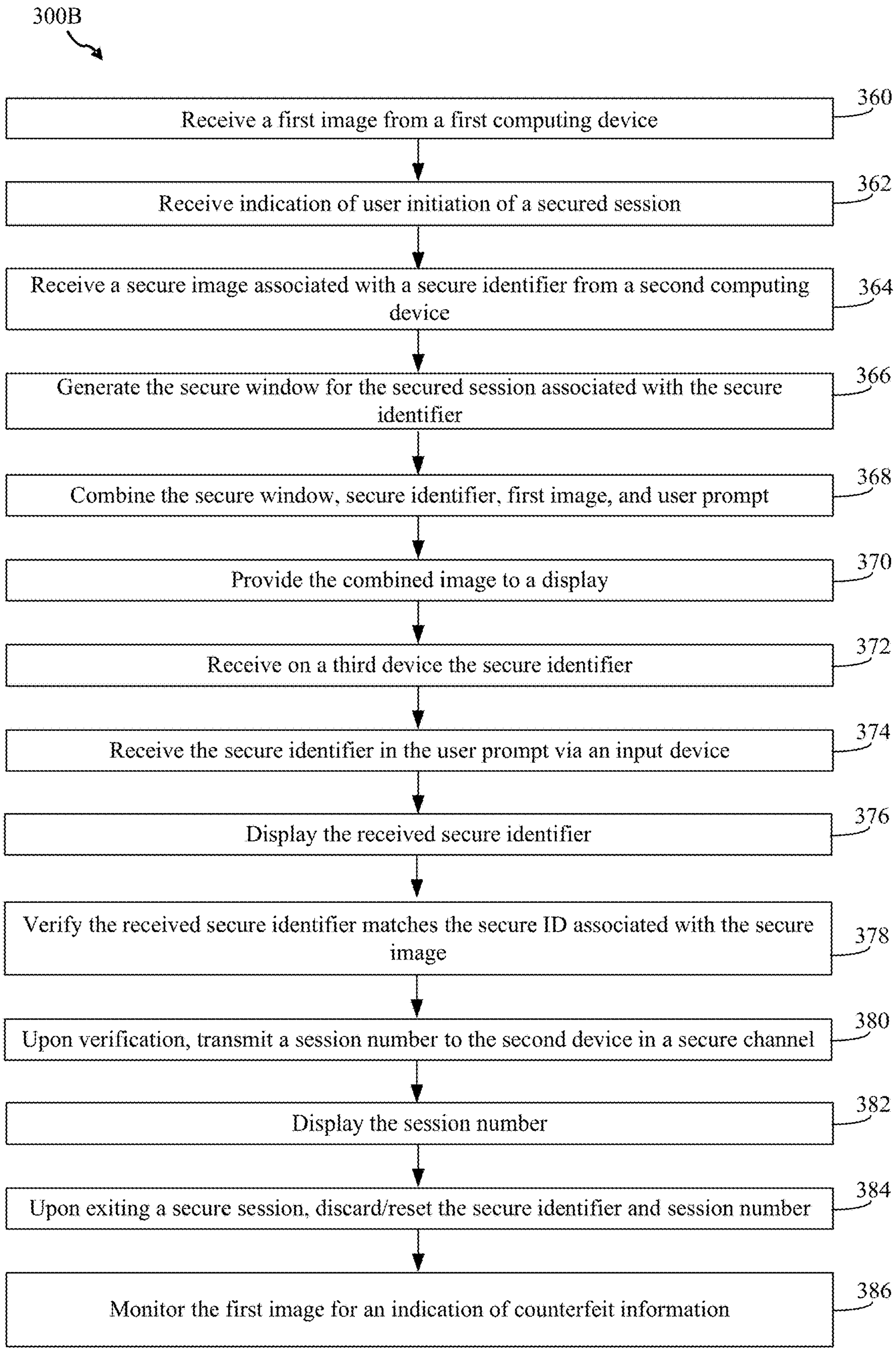
FIG. 3B shows a flowchart of another process for phishing protection, according to an embodiment.

System 300B may operate in various ways. For instance, FIG. 3B shows a flowchart 300B of a process for phishing protection, according to an embodiment. Example computing system 300A, as shown by examples in FIG. 3A, may operate according to flowchart 300B, e.g., in some embodiments. For example, example flowchart 300B may be implemented by processor 122 executing secure session app 324. Various embodiments may implement one or more steps shown in FIG. 3B with additional and/or alternative steps. Further structural and operational embodiments will be apparent to persons skilled in the relevant art(s) based on the following description of FIG. 3B.

Flowchart 300B includes step 360. In step 360, a first image is received from a first computing device. For example, as shown in FIG. 3A, secure device 114 (e.g., secure session app 124 executed by processor 122) may receive first image 110 (e.g., via interface(s) 116) from first computing device 104.

In step 362, an indication of user initiation of a secured session is received. For example, as shown in FIG. 3A, secure device may receive an indication 338 that a user is requesting a secure session (e.g., by inputting/traversing to a secure URL).

In step 364, a secure image associated with a secure identifier is received from a second computing device. For example, as shown in FIG. 3A, secure session app 324 executed by processor 122 may receive (e.g., via network(s) 112 and interface(s) 116) remote content, including secure ID 308 from second computing device 302.

In step 366, a secure window is generated for the secured session associated with the secure identifier. For example, as shown in FIG. 3A, secure image generator 126 may generate secure image 128 based on remote content associated with secure ID 308.

In step 368, the secure window, secure identifier, and user prompt are combined with (e.g., overlaid over) the first image. For example, as shown in FIG. 3A, combiner 130 may combine first image 110 and secure image 128, e.g., by overlaying secure image 128 over first image 110, including a user prompt to enter a secure identifier.

In step 370, the combined image is provided to a display. For example, as shown in FIG. 3A, secure session app 124 may output combined image 136 to monitor 146 via interface(s) 116.

In step 372, the secure identifier is received on a third device (e.g., user mobile phone). For example, as shown in FIG. 3A, a user may receive a text message on the user's cell phone 354 from a cell tower 352 associated with network(s) 112. The text message may indicate the secure identifier 326 used by the second computing device 302.

In step 374, a secure identifier (e.g., character string) is received via input device(s) 148. For example, as shown in FIG. 3A, secure session app 324 may display the user prompt in the combined image 136 displayed on monitor 146 to request that the user enter the secure identifier received on the user's cell phone 354.

In step 376, the secure identifier is displayed, e.g., to allow the user to manually spot a phishing attempt. For example, as shown in FIG. 3A, secure session app 124 may signal interface(s) 116 to drive display 120 to display the secure identifier received from the user.

In step 378, the received secure identifier is verified to match the secure ID associated with the secure image. For example, as shown in FIG. 3A, secure session app 324 may compare the secure ID associated with remote content 308 to the secure ID the user provided 338 via input device(s) 148 to verify they match.

In step 380, upon verification, a "session number" is transmitted to the second device in a secure channel. For example, as shown in FIG. 3A, secure session app 324 may generate and send a session number to second computing device 302 via interface(s) 116 and network(s) 112.

In step 382, the session number is displayed (e.g., with the combined image and/or on the LCD). For example, as shown in FIG. 3A, secure session app 324 may provide secure image generator 126 and/or display 120 with the session number for display on monitor 146 and/or display 120.

In step 384, upon exiting a secure session, the secure identifier and session number are discarded/reset. For example, as shown in FIG. 1A, secure session app 124 may discard secure identifier 150 and the session identifier.

In step 386, the first image is monitored (e.g., during and outside a secure session) for an indication of a counterfeit information (e.g., secure image or secure identifier). For example, as shown in FIG. 1A, detector 132 may monitor first image 110 for counterfeit information.

FIG. 4A shows a block diagram of a system 400A configured to provide phishing protection, in accordance with an embodiment. Compared to the example shown in FIG. 1A, the example shown in FIG. 4A provides an example of monitoring, detecting, and alerting a user about a phishing attempt. Secure device 114 receives first image 410 including counterfeit secure information 460 (e.g., counterfeit secure image and identifier) from first computing device 104 while secure device 114 is not generating a secure session. The example shows a counterfeit secure image with counterfeit secure border and a counterfeit secure identifier. Detector 132 detects the counterfeit secure information. Alert generator 134 generates an alert. Combiner 130 generates a combined image 436, including a phishing alert message overlaid over counterfeit secure information 460. Monitor 146 displays combined image 436 as phishing alert display 464 overlaid over first image display with counterfeit secure information 462.

Figure 4B:
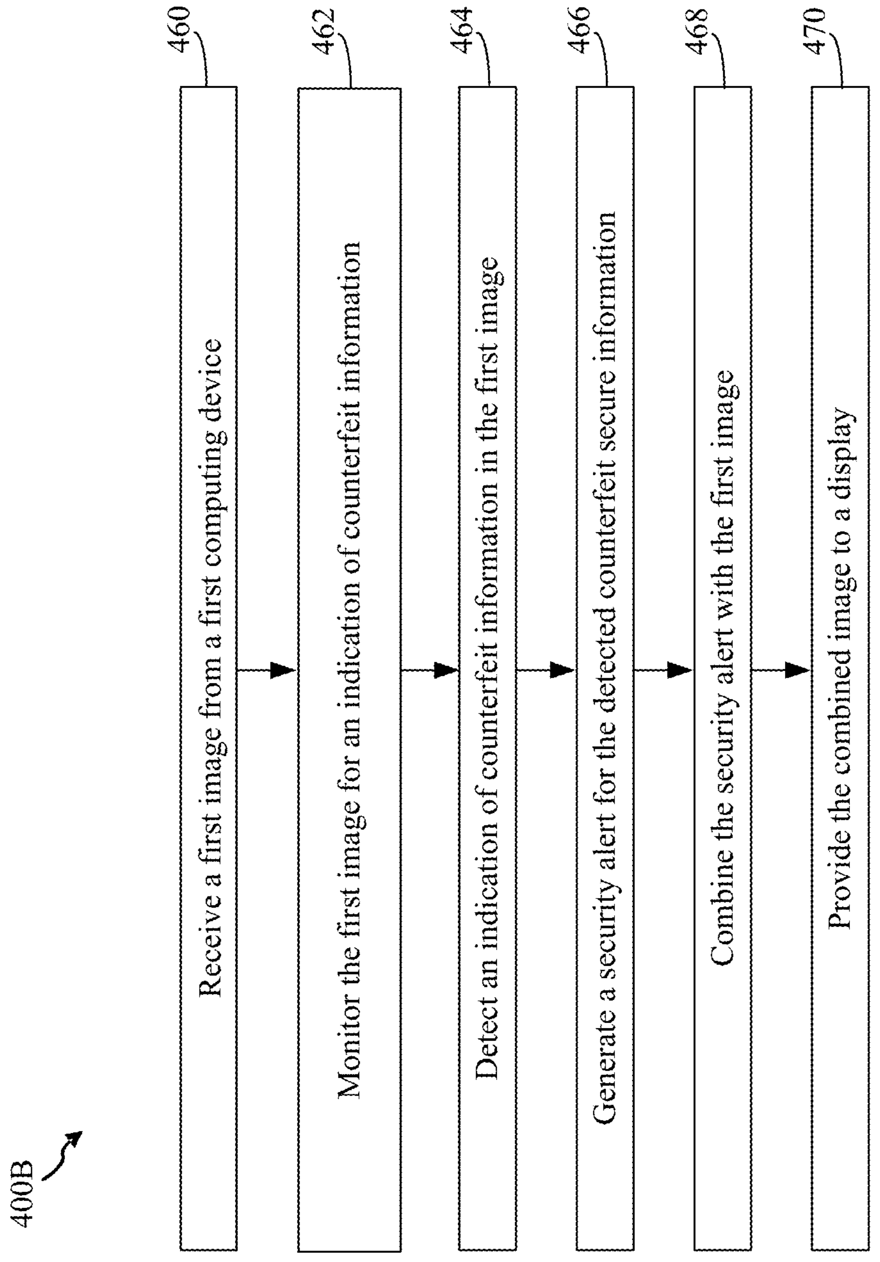
FIG. 4B shows a flowchart of another process for phishing protection, according to an embodiment.

Embodiments described herein may operate in various ways. For instance, FIG. 4B shows a flowchart 400B of a process for phishing protection, according to an embodiment. Example computing system 400A, as shown by examples in FIG. 4A, may operate according to flowchart 400B, e.g., in some embodiments. For example, example flowchart 400B may be implemented by processor 122 executing secure session app 124. Various embodiments may implement one or more steps shown in FIG. 4B with additional and/or alternative steps. Further structural and operational embodiments will be apparent to persons skilled in the relevant art(s) based on the following description of FIG. 4B.

Flowchart 400B includes step 460. In step 460, a first image is received from a first computing device. For example, as shown in FIG. 4A, secure device 114 (e.g., secure session app 124 executed by processor 122) may receive first image 410 (e.g., via interface(s) 116) from first computing device 104. First image 410 includes counterfeit secure information 460.

In step 462, the first image is monitored (e.g., during and outside a secure session) for an indication of a counterfeit information (e.g., secure image or secure identifier). For example, as shown in FIG. 4A, detector 132 may monitor first image 410 for counterfeit information.

In step 464, an indication of counterfeit information is detected in the first image. For example, as shown in FIG. 4A, detector 132 may detect counterfeit secure information 460 in first image 410, e.g., by identifying indications of the fake secure border, fake secure identifier, etc. while analyzing information in first image 410. Detector 132 may notify alert generator 134 that counterfeit secure information was detected.

In step 466, a security alert is generated for the detected counterfeit secure information. For example, as shown in FIG. 4A, alert generator 134 may generate a security alert (e.g., phishing attempt) message. Alert generator 134 may provide the security alert to combiner 130.

In step 468, the security alert is combined with (e.g., overlaid over) the first image. For example, as shown in FIG. 4A, combiner 130 may combine the security alert with the first image 110, e.g., by overlaying the security alert over first image 110.

In step 470, the combined image is provided to a display. For example, as shown in FIG. 4A, secure session app 124 may output combined image 436 to monitor 146 via interface(s) 116. Monitor 146 may display combined image 436 as phishing alert display 464 overlaid over first image display with counterfeit secure information 462.

Figure 5:
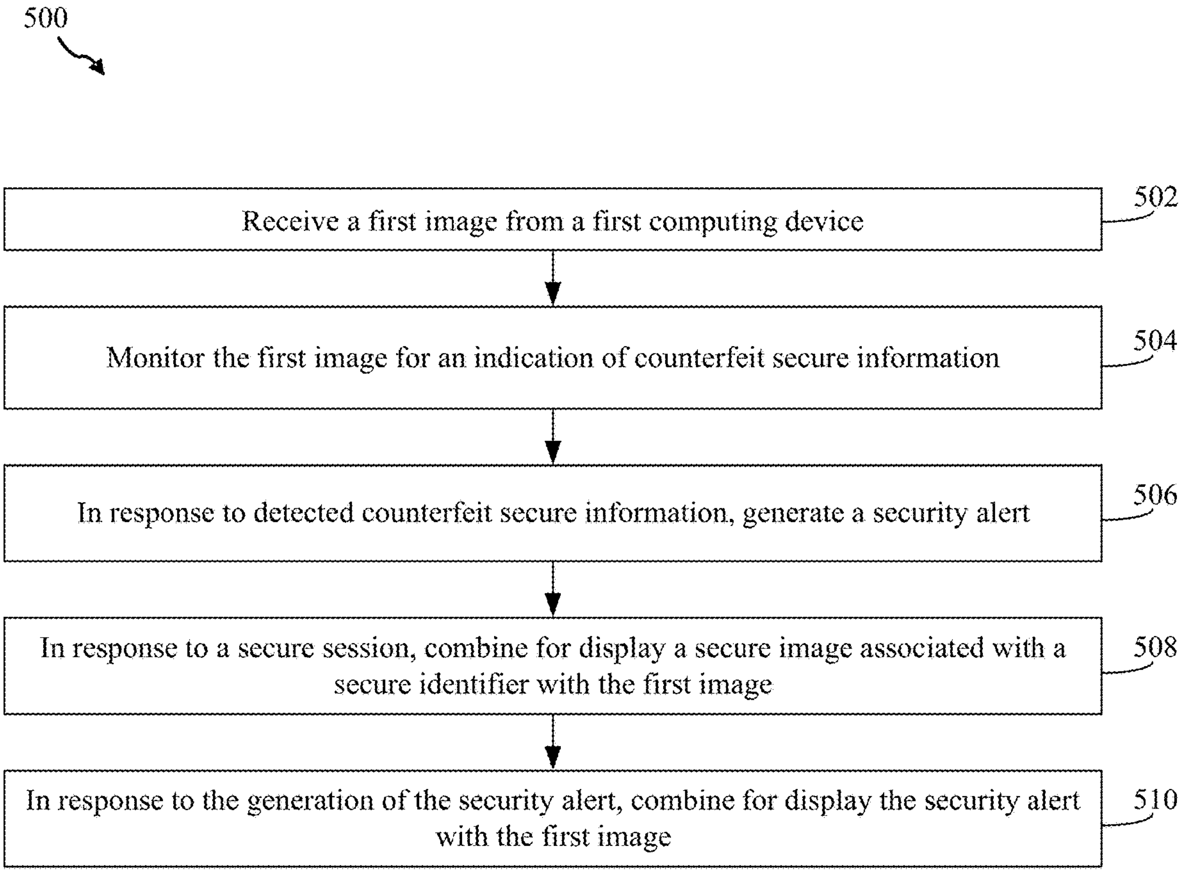
FIG. 5 shows a flowchart of yet another process for phishing protection, according to an embodiment.

Embodiments described herein may operate in various ways. For instance, FIG. 5 shows a flowchart 500 of a process for phishing protection, according to an embodiment. Example computing system 100A, 200A, 300A, and/or 400A, as shown by examples in FIGS. A1, 2A, 3A, and 4A, may operate according to flowchart 500, e.g., in some embodiments. For example, example flowchart 500 may be implemented by processor 122 executing secure session app 124/324. Various embodiments may implement one or more steps shown in FIG. 5 with additional and/or alternative steps. Further structural and operational embodiments will be apparent to persons skilled in the relevant art(s) based on the following description of FIG. 5.

Flowchart 500 includes step 502. In step 502, a first image is received from a first computing device. For example, as shown in FIG. 1A, secure device 114 (e.g., secure session app 124 executed by processor 122) may receive first image 110 (e.g., via interface(s) 116) from first computing device 104.

In step 504, the first image is monitored for an indication of counterfeit secure information (e.g., secure image or secure identifier). For example, as shown in FIGS. 1A and 4A, detector 132 may monitor first image 110/410 for counterfeit information.

In step 506, in response to detected counterfeit secure information, a security alert is generated. For example, as shown in FIG. 4A, alert generator 134 may generate a security alert (e.g., phishing attempt) message. Alert generator 134 may provide the security alert to combiner 130.

In step 508, in response to a secure session, a secure image associated with a secure identifier is combined with the first image. For example, as shown in FIG. 1A, secure image generator 126 may generate secure image 128 based on remote content 108 received from second computing device 102. Secure session app may receive a secure identifier (e.g., secure identifier 150/138) from secure identifier generator 118 or input device(s) 148. Combiner 130 may combine first image 110 and secure image 128 associated with a secure identifier 150/138, e.g., by overlaying secure image 128 (e.g., with secure identifier 150/138) over first image 110 in combined image 136.

In step 510, in response to the generation of the security alert, the security alert is combined with the first image. For example, as shown in FIG. 4A, combiner 130 may combine the security alert with the first image 110, e.g., by overlaying the security alert over first image 110 in combined image 436.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of first computing device 104, second computing device 102, and secure device 114, in whole or in part, shown in FIGS. 1A, 2A, 3A, and 4A, which may include one or more of the components of computing device 602. In some embodiments, computing device 602 is communicatively coupled with devices (not shown in FIG. 6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 610 may include one or more general processors (e.g., CPUs) configured with or coupled to one or more hardware accelerators, such as one or more NPUs and/or one or more GPUs.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers)

and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing secure identifier generator 118, secure session app 124, secure image generator 126, combiner 130, detector, alert generator 134, secure identifier generator 318, and/or secure session app 324, as well as any of flowcharts 100B, 200B, 300B, 400B, 500, and/or any individual steps thereof.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform.

In an embodiment, computing device 602 may access application programs 676 for execution in any manner, such as by a client application and/or a browser at computing device 602.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client, configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

V. Additional Example Embodiments

Systems, methods, and instrumentalities are described herein related to phishing protection. A secure session may be implemented between devices without trust in intervening devices or components. A security identifier may be displayed in association with secure content. A secure identifier may also be displayed separately for comparison. A security identifier may be generated by a user, a local secure source, or a remote secure source. A user may visually and/or physically confirm a security identifier. An identifier may be, for example, a character string or a quick response (QR) code. Phishing attempts may be monitored, detected, and alerted during and outside a secure session.

In examples, a device (e.g., a docking station) may be configured to modify images from a first computing device to a display monitor. The device may comprise a processor and a memory device comprising program code structured to cause the processor to: receive a first image from the first computing device; monitor the first image for an indication of counterfeit secure information; generate a security alert if the detector detects counterfeit secure information; and perform at least one of: in response to a secure session, combine the first image with a secure image associated with a secure identifier, or in response to the detector detecting counterfeit secure information, combine the first image with the security alert.

In another example, a device may be configured to modify images from a first computing device to a display monitor. The device may comprise an interface configured to receive a first image (e.g., display video) from the first computing device; a detector configured to monitor the first image for an indication of counterfeit secure information (e.g., secure image or secure identifier); an alert generator configured to generate a security alert if the detector detects counterfeit secure information; and a combiner configured to combine with (e.g., overlay over) the first image: (i) in response to a secure session, a secure image (e.g., secure window) associated with a secure identifier and (ii) in response to the detector detecting counterfeit secure information, the security alert.

In examples, the interface may be configured to receive the secure image from a second (e.g., remote) computing device.

In examples, the interface may be configured to receive the secure identifier from a second (e.g., remote) computing device.

In examples, the interface may be configured to receive the secure identifier from a user interface.

In examples, the device may further comprise an identifier generator configured to generate the secure identifier.

In examples, the device may further comprise an image generator configured to generate the secure image.

In examples, the device may further comprise a display (e.g., LCD) configured to display the secure identifier for visual comparison to a display of the combined image.

In examples, the secure identifier may comprise a character string (e.g., numbers, letters, other characters).

In examples, the secure identifier may comprise a quick response (QR) code.

In examples, the secure identifier may comprise a watermark embedded in the second image.

In examples, a method may comprise receiving a first image from a first computing device; monitoring the first image for an indication of a counterfeit secure information; generating a security alert if there is a detected counterfeit secure information; in response to a secure session, combining for display a secure image associated with a secure identifier with the first image; and in response to the generation of the security alert, combining for display the security alert with the first image.

In examples, the method may further comprise receiving the secure image from a second computing device.

In examples, the method may further comprise receiving the secure identifier from a second computing device.

In examples, the method may further comprise receiving the secure identifier from a user interface.

In examples, the method may further comprise generating the secure identifier.

In examples, the method may further comprise generating the secure image.

In examples, the method may further comprise displaying the secure identifier for visual comparison to a display of the combined image.

In examples, a computer-readable storage device may have instructions recorded thereon that, when executed by a hardware accelerator, implement a method. The method may comprise receiving a first image from a first computing device; monitoring the first image for an indication of a counterfeit secure information; generating a security alert if there is a detected counterfeit secure information; in response to a secure session, combining for display a secure image associated with a secure identifier with the first image; and in response to the generation of the security alert, combining for display the security alert with the first image.

In examples, the method may further comprise receiving at least one of the secure image or the secure identifier from a second computing device.

In examples, the method may further comprise performing at least one of the following: receiving the secure identifier from a user interface; generating the secure identifier; generating the secure image; or displaying the secure identifier for visual comparison to a display of the combined image.

In examples, a method in a docking station for detecting a phishing attempt may comprise, for example, receiving an indication of a secured session initiated on a host device coupled to a monitor through the docking station; receiving a unique identifier; displaying a secure window for a secured session on the monitor with the identifier displayed in association with the secure window; displaying the identifier on the docking station; monitoring for an identifier pattern based on predefined identifier pattern characteristics in a video feed received from the host device; detecting an instance of the identifier pattern in a video feed from the host device; determining the detected pattern includes counterfeit information (e.g., an invalid identifier) indicative that a fake secure window is displayed as a phishing attempt on the monitor by the host device; and displaying a warning of the phishing attempt on the monitor.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A device configured to modify images from a first computing device to a display monitor, the device comprising:
- a processor;
- a memory device comprising program code structured to cause the processor to:
  - receive a first image from the first computing device;
  - monitor the first image for an indication of counterfeit secure information;
  - generate a security alert in response to detecting the counterfeit secure information;
  - in response to a secure session, generating a combined image comprising the first image combined with a secure image associated with a secure identifier, and outputting the combined image to a display; and
  - in response to the detector detecting counterfeit secure information, combine the first image with the security alert.

2. The device of claim 1, wherein the secure image is received from a second computing device.

3. The device of claim 1, wherein the secure identifier is received from a second computing device.

4. The device of claim 1, wherein the secure identifier is received from a user interface.

5. The device of claim 1, wherein the program code is further structured to cause the processor to:
- generate the secure identifier.

6. The device of claim 1, wherein the program code is further structured to cause the processor to:
- generate the secure image.

7. The device of claim 1, wherein the program code is further structured to cause the processor to:
- display the secure identifier for visual comparison to a display of the combined image.

8. The device of claim 1, wherein the secure identifier comprises a character string.

9. The device of claim 1, wherein the secure identifier comprises a quick response (QR) code.

10. The device of claim 1, wherein the secure identifier comprises a watermark embedded in the second image.

11. A method, comprising:
- receiving a first image from a first computing device;
- monitoring the first image for an indication of counterfeit secure information;
- in response to detected counterfeit secure information, generating a security alert;
- in response to a secure session, generating a combined image comprising the first imaged combined with a secure image associated with a secure identifier, and outputting the combined image to a display; and
- in response to the generation of the security alert, combining for display the security alert with the first image.

12. The method of claim 11, further comprising:
receiving the secure image from a second computing device.

13. The method of claim 11, further comprising:
receiving the secure identifier from a second computing device.

14. The method of claim 11, further comprising:
receiving the secure identifier from a user interface.

15. The method of claim 11, further comprising:
generating the secure identifier.

16. The method of claim 15, further comprising:
generating the secure image.

17. The method of claim 11, further comprising:
displaying the secure identifier for visual comparison to a display of the combined image.

18. A computer-readable storage device having instructions recorded thereon that, when executed by a hardware accelerator, implements a method comprising:
receiving a first image from a first computing device;
monitoring the first image for an indication of a counterfeit secure information;
generating a security alert in response to detecting the counterfeit secure information;
in response to a secure session, generating a combined image comprising the first image combined with a secure image associated with a secure identifier, and outputting the combined image to a display; and
in response to the generation of the security alert, combining for display the security alert with the first image.

19. The computer-readable storage device of claim 18, the method further comprising:
receiving at least one of the secure image or the secure identifier from a second computing device.

20. The computer-readable storage device of claim 18, the method further comprising:
performing at least one of the following:
receiving the secure identifier from a user interface;
generating the secure identifier;
generating the secure image; or
displaying the secure identifier for visual comparison to a display of the combined image.

* * * * *